United States Patent
Helfenstein

(10) Patent No.: US 11,422,014 B2
(45) Date of Patent: Aug. 23, 2022

(54) FLOW METER HAVING A MEASURING CHANNEL FORMED BY A HYDROFORMING PROCESS

(71) Applicant: GWF MESSSYSTEME AG, Lucerne (CH)

(72) Inventor: Markus Helfenstein, Lucerne (CH)

(*) Notice: Subject to any disclaimer, the term of this patent is extended or adjusted under 35 U.S.C. 154(b) by 91 days.

(21) Appl. No.: 16/632,399

(22) PCT Filed: Aug. 7, 2018

(86) PCT No.: PCT/EP2018/071402
§ 371 (c)(1),
(2) Date: Jan. 20, 2020

(87) PCT Pub. No.: WO2019/030229
PCT Pub. Date: Feb. 14, 2019

(65) Prior Publication Data
US 2020/0232830 A1 Jul. 23, 2020

(30) Foreign Application Priority Data
Aug. 8, 2017 (DE) .................. 10 2017 118 042.7

(51) Int. Cl.
*G01F 1/66* (2022.01)
*G01F 15/00* (2006.01)

(52) U.S. Cl.
CPC .............. *G01F 1/662* (2013.01); *G01F 15/00* (2013.01)

(58) Field of Classification Search
None
See application file for complete search history.

(56) References Cited

U.S. PATENT DOCUMENTS

| 5,437,194 | A | * | 8/1995 | Lynnworth | G01F 1/662 73/861.27 |
| 6,189,389 | B1 | | 2/2001 | van Bekkum et al. | |
| 7,469,599 | B2 | * | 12/2008 | Froehlich | G01F 1/66 73/861.27 |
| 8,286,503 | B2 | * | 10/2012 | Neuburger | G01F 1/588 73/861.12 |
| 9,389,109 | B2 | | 7/2016 | Gledhill, III et al. | |
| 9,689,727 | B2 | | 6/2017 | Kissling et al. | |

(Continued)

FOREIGN PATENT DOCUMENTS

| CN | 105190254 A | 12/2015 |
| CN | 105209864 A | 12/2015 |

(Continued)

OTHER PUBLICATIONS

Office Action issued by the EPO for parallel application EP18 752 149.7 dated Mar. 18, 2021 with English translation.

(Continued)

*Primary Examiner* — Harshad R Patel
(74) *Attorney, Agent, or Firm* — Mindful IP PLLC

(57) ABSTRACT

A flow meter includes at least two spaced-apart measuring sensors, preferably ultrasonic sensors, wherein the coupling in and out of the measurement signals in or out of a fluid occurs via a coupling part which is inserted into a circumferential wall of a measuring channel produced via hydroforming. Alternatively, the coupling in and out of the measurement signals can also occur through a wall of the measuring channel.

20 Claims, 3 Drawing Sheets

(56) References Cited

U.S. PATENT DOCUMENTS

| | | | |
|---|---|---|---|
| 2002/0124661 A1 | 9/2002 | Wagner | |
| 2007/0151362 A1* | 7/2007 | Mori | G01F 1/663 73/861.27 |
| 2011/0162460 A1* | 7/2011 | Allen | G01F 1/667 73/861.18 |
| 2011/0162461 A1* | 7/2011 | Allen | G01F 1/667 73/861.18 |
| 2014/0076062 A1* | 3/2014 | Bober | G01F 1/662 73/861.18 |
| 2015/0143919 A1* | 5/2015 | Nakano | G01F 1/662 73/861.28 |
| 2015/0159811 A1* | 6/2015 | Christie | B21D 26/033 72/54 |
| 2015/0330819 A1 | 11/2015 | Berberig | |
| 2016/0116316 A1 | 4/2016 | Kissling et al. | |
| 2017/0314977 A1 | 11/2017 | Wiest et al. | |
| 2019/0226893 A1* | 7/2019 | Kuhlemann | G01F 1/662 |

FOREIGN PATENT DOCUMENTS

| | | | |
|---|---|---|---|
| DE | 10120355 A1 | 10/2002 | |
| DE | 102011090082 A1 | 7/2013 | |
| DE | 102014106927 A1 | 11/2015 | |
| EP | 0890826 B1 | 11/2009 | |
| EP | 2306160 A1 | 4/2011 | |
| EP | 2386836 B1 | 1/2016 | |
| KR | 101327182 B1 | 11/2013 | |
| RU | 2659353 C1 | 6/2018 | |
| WO | WO-2008107246 A1 * | 9/2008 | G01N 29/28 |
| WO | 2010069869 A1 | 6/2010 | |
| WO | 2014/195118 A1 | 12/2014 | |
| WO | 2016091477 A1 | 6/2016 | |
| WO | WO-2018011372 A1 * | 1/2018 | G01F 15/185 |
| WO | WO-2020002312 A1 * | 1/2020 | G01F 1/662 |

OTHER PUBLICATIONS

Office Action issued by China National Intellectual Property Administration for the parallel patent application CN 201880051791.7 dated Feb. 2, 2021 with English translation.

International Search Report and Written Opinion for PCT/EP2018/071402 dated Oct. 23, 2018 (11 pages; with English translation).

Notification of Transmittal of Translation, International Preliminary Report on Patentability and Written Opinion of International Searching Authority dated Feb. 20, 2020 regarding International Application No. PCT/EP2018/071402 (7 pages).

Russian Search Report dated Sep. 9, 2021 re PCT/EP2018/071402 (original with English translation) (4 pages).

Russian Office Action dated Sep. 9, 2021 re Russian Application No. 2020109865/28(016295) ( (original with English translation) (14 pages).

European Office Action dated Dec. 2, 2021 re European Application No. 18752149.7 1001 ( (original with English translation) (11 pages).

Chinese Office Action with supplemental search dated Dec. 10, 2021 re Chinese Application No. 201880051791.7 (original with English translation) (14 pages).

Japanese Office Action dated Apr. 21, 2022 against correlated Japanese patent application No. 2020-505220.

* cited by examiner

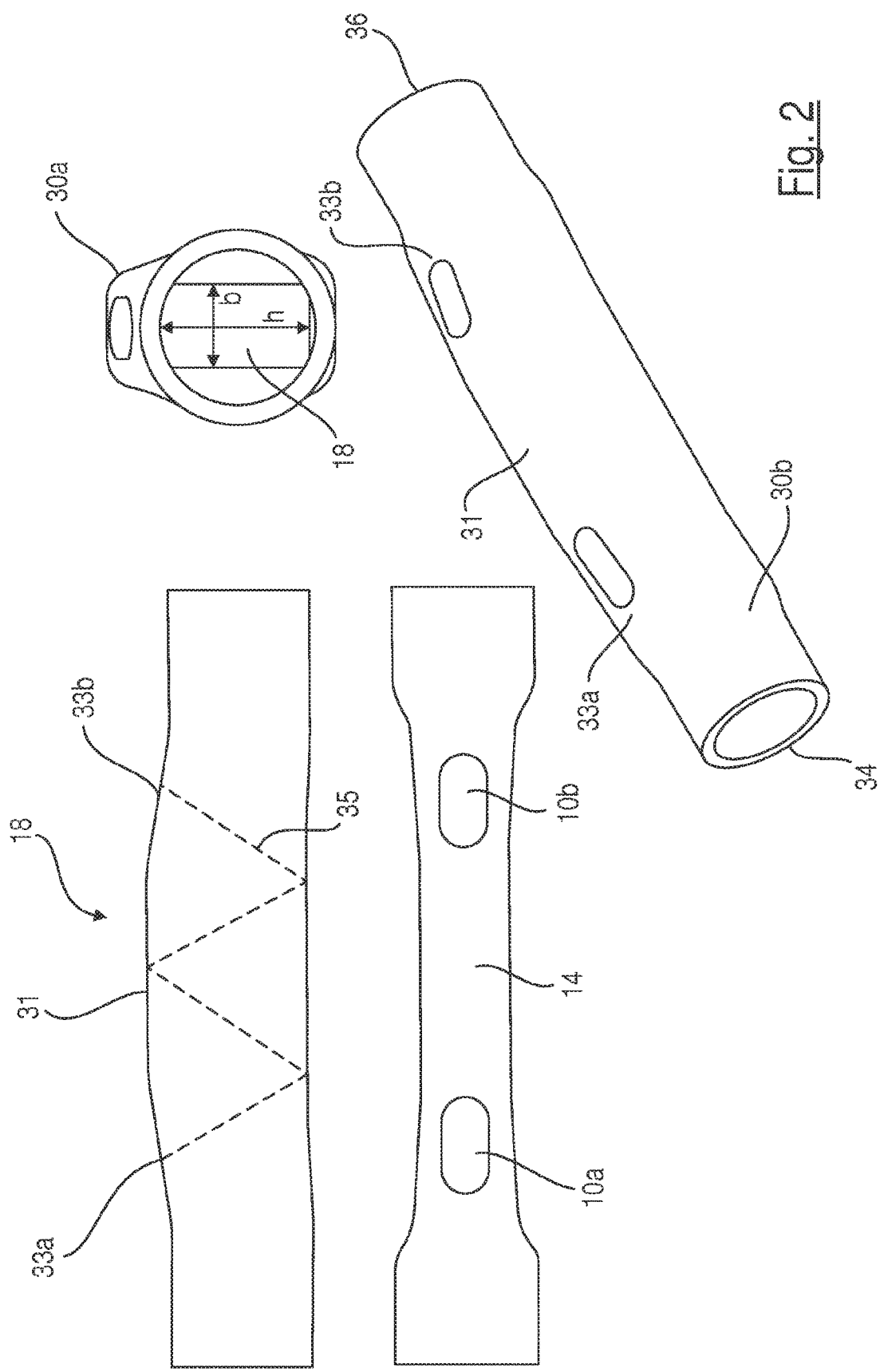

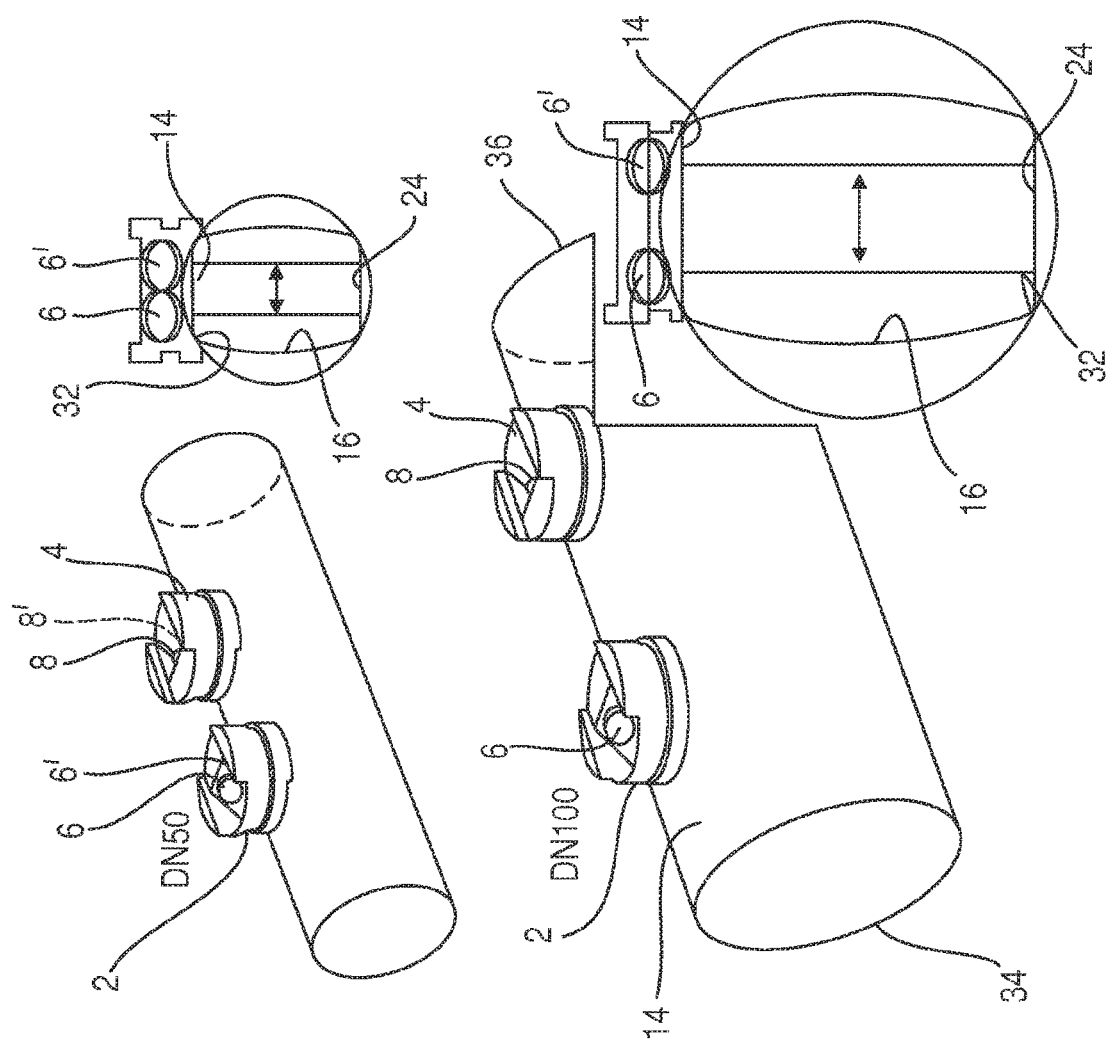

FLOW METER HAVING A MEASURING CHANNEL FORMED BY A HYDROFORMING PROCESS

CROSS-REFERENCE TO RELATED APPLICATIONS

This application is a national stage of, and claims priority to, Patent Cooperation Treaty Application No. PCT/EP2018/071402, filed on Aug. 7, 2018, which application claims priority to German Application No. DE 10 2017 118 042.7, filed on Aug. 8, 2017, which applications are hereby incorporated herein by reference in their entireties.

DESCRIPTION

Disclosed is a flow meter for measuring the flow of fluids in a pipe line or the like and a suitable measuring channel.

Solutions are known having a measuring insert in which ultrasonic transducers are housed. This measuring insert is inserted into a recess of a pipe section/measuring channel, whereby the actual measuring channel can also be a part of this measuring insert.

Such a solution is shown for example in DE 101 20 355 A1, wherein the two ultrasonic transducers are arranged in the direction of flow at a distance from each other and on opposite sides of the measuring channel.

In EP 2 306 160 A1, a flow meter/flow counter is disclosed, in which the measuring insert houses the ultrasonic transducers and also forms the actual measuring channel. A profile body forming the measuring channel is inserted through a recess of the pipe line section which is surrounded by a flange, wherein this profile body influences the flow within the measuring region and on which additional reflectors for the measuring signals are provided.

A similar solution is shown in EP 2 386 836 B1. The flow guidance within the measuring channel is determined by a housing insert that can be inserted from the front of the housing, which also carries reflectors for the ultrasonic signals, so that the ultrasound is emitted by one of the ultrasonic transducers and reflected via the reflectors to the other ultrasonic transducer, which is arranged for example downstream. Of course, the signal can also be guided in the opposite direction.

In the published document EP 0 890 826 B1, a flow meter is described in which a measuring insert is attached to a tangential flange also in the area of a pipe section of a housing.

The disadvantage of such solutions is that the measuring channel consists of materials that require high effort in the manufacturing process.

In view of this, the disclosure is based on the object of creating a flow meter/flow counter and a measuring channel which can be produced with in terms of production and processes.

This object is solved with respect to a flow meter and with respect to a measuring channel with the features as disclosed herein.

With a flow meter of the type described at the beginning, the object is solved according to the disclosure by creating the measuring channel by hydroforming.

The manufacturing process of hydroforming ensures that, regardless of the required size of the measuring channel, a comparatively thin-walled measuring channel can be produced in one manufacturing step. Regardless of whether it is a measuring channel for a house water meter (from DN15) or a bulk water meter (up to DN300), the manufacturing process can be used. Hydroforming is imaginable for measuring channels with different outer wall thicknesses of pipes. Different metallic materials as the starting material of the pipe allow a wide range of variants and do not require any reworking. Another advantage over cast measuring channels is that a surface layer with a finer structure is achieved, so that less turbulence can occur in the area of the measuring channel, which would impair the measuring accuracy. Furthermore, a hydroformed profile can be adapted to different conditions, whereby always the same basic profile can be used.

In one variant the measuring channel has at least two recesses for accommodating a measuring device. These are located on one side of the measuring channel at a distance from each other in the flow direction. The recesses can, for example, be designed as elongated holes and can be introduced in the process of hydroforming.

Alternatively, it is also possible to form the recesses in a subsequent production step, for example by laser cutting on the hydroformed profile.

In an alternative solution, the recesses for accommodating a measuring device are omitted, so that the latter can sound through the wall of the measuring channel.

In an example, a cross-section profile of the measuring channel along the flow direction is designed with a larger clear width than across it. By increasing the dimension in this direction, a signal path and thus the transit time of a signal of the measuring device is increased as compared to a round cross-section. This increases the measuring accuracy.

In the hydroforming process, the diameter of the pipe is brought into the shape described above. In order to avoid stress peaks and thus fractures in the most deformed areas, i.e. the transition sections, they are constructed with a rounded shape. This applies to the area from the round pipe to the aforementioned cross-section profile as well as to the transition sections between the long and narrow side walls of the measuring channel.

The process of hydroforming makes it possible to form the measuring channel in one working step. Only a pipe is required as a semi-finished product, from which the measuring channel is manufactured in one piece. The pipe can be formed with a round cross section, but also with a rectangular or square cross section or in any other way. A variant with or without flange can be produced in one production step.

According to the disclosure, it is preferred if the connection flanges are formed in a production step following hydroforming.

The connection flange can be formed by a kind of beading process on the measuring channel itself or by subsequent attachment, e.g. by welding, shrinking, or gluing the separately manufactured connection flange to the measuring channel.

In another variant of the flow meter, the measuring channel is designed in such a way that an approximately roof-shaped bulge occurs preferably on one side, wherein the recesses for the sensors are then arranged in the area of two inclined walls of the bulge.

In a preferred construction example, the sensors are arranged in the area of the bulge. A particular advantage of this configuration is that the sensors are then arranged at an angle, so that the signals are coupled into and out of the measuring channel at a corresponding angle. This not only significantly facilitates the positioning but also the orientation of the sensors as compared to a straight measuring channel without bulging.

It is advantageous if in hydroforming only the area of the measuring channel is deformed, which is not located in the area of an inlet and an outlet. This ensures that these areas are still designed like the basic profile, for example as a round profile, and that only the section provided for this purpose, between the sensors, is deformed with a height greater than width in the measurement/in-coupling/out-coupling direction to improve the measuring accuracy. According to the disclosure, it is preferred if the approximately rectangular profile is arranged horizontally so that the smaller width runs in the vertical direction (direction of gravity).

According to the disclosure, a measuring channel for a flow meter is accordingly produced by hydroforming.

BRIEF DESCRIPTION OF THE DRAWINGS

Preferred examples of the disclosure are explained in the following by means of schematic drawings. These show:

FIG. 2 shows a measuring channel in the construction example according to the disclosure;

FIG. 3 shows further examples of measuring channels.

DETAILED DESCRIPTION

Figure 1:
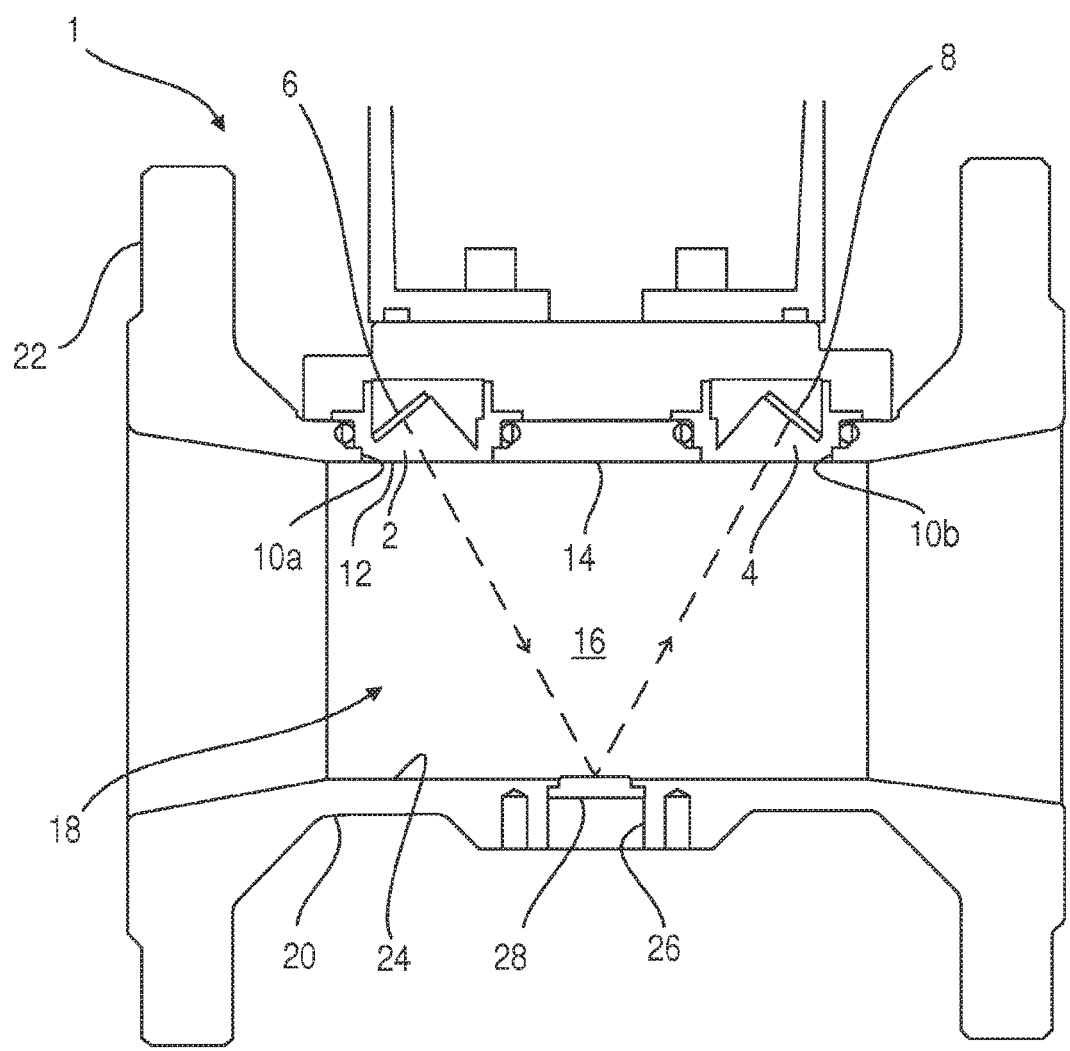
FIG. 1 shows a basic structure of a flow meter.

FIG. 1 shows a longitudinal section of a flow meter 1. Two coupling members 2, 4 with two sensors 6 and 8 can be seen in this illustration. These are respectively inserted in two recesses 10a, 10b. The coupling surfaces 12 are flush with the circumferential wall (transverse wall 14 and adjacent areas of a side wall 16) of a measuring channel 18, which is formed in this example by a pipe section 20. A part of a flange 22 thus forms the transverse wall 14. In this example, an opposite transverse wall 24 is formed with a pocket 26 open to the outside, into which a reflector 28 is inserted.

FIG. 2 shows a measuring channel 18, here without flange, produced by hydroforming. The two recesses 10a, 10b are clearly visible. In the upper right of FIG. 2, a cross section of the measuring channel is shown, which shows that the clearance height h is greater than the width b in the flow region of the measuring channel 18.

In the example shown in FIG. 2, the cross-section profile (top right) is shown in such a way that the height h runs vertically (direction of gravity), so that the rectangular profile is arranged in an upright position so to speak. For field installation, however, it is preferred if the profile is installed "lying", so that the smaller width b is arranged in the vertical direction. This lying position of use offers the advantage that no air accumulation can occur in the area of the recesses 10a, which would lead to incorrect measurement.

The transition sections 30a in the region of the measuring channel and the transition sections 30b in the transition-section region from the basic profile to the region of the measuring channel 18 are designed as rounded sections. The raw part as basic profile is, for example, a round profile for each measuring channel. Instead of the round profile, of course another pipe profile can be used, for example a rectangular or square profile or any other cross-sectional shape. All hydroformable materials are possible as materials, i.e. steel, stainless steel, special alloys, aluminum, copper, brass, or titanium. Hydroforming transforms the basic profile, e.g. a round profile (pipe), into the shape of the measuring channel 18, whereby it remains a round profile (basic profile) in the area of the inlet 34 and the outlet 36. The measuring channel 18 can be produced with or without flange 22. Due to the very low tension and springback, a very high dimensional accuracy is achieved by hydroforming.

As explained above, the flanges 22 can also be formed by a follow-up process, such as a beading process. Alternatively, the flanges can also be connected by welding, shrinking, gluing or in any other way to the measuring channel formed by hydroforming.

The special form of the measuring channel 18 is also visible. The recesses 10a, 10b are formed in the area of a bulge 31. This bulge 31 can significantly facilitate the positioning and orientation of sensors 6, 8 and the coupling members 2, 4, in contrast to a measuring channel 18 without the bulge 31. The high dimensional accuracy of a hydroformed measuring channel 18 increases the effect of the simplified orientation. Due to the shape of the bulge 31, the recesses 10 are arranged on inclined walls 33. The recesses 10 arranged in this way allow the signals of the sensors 6, 8 to be coupled into and out of the measuring channel 18 at an adapted angle.

Depending on the degree of inclination of the inclined walls 33, a different reflector arrangement than for the example described above can be used. In this case, instead of only one reflector 18 on the transverse wall 24 opposite the sensors 6, 8, a reflector arrangement with three reflectors is installed. Two of the reflectors 18 are formed on the transverse wall 24 and one reflector 18 is formed between the sensors 6, 8 in the area of the bulging 31, so that a W-shaped signal path 35 is formed, as indicated in FIG. 2 (reflectors are not shown). With a corresponding variant of the measuring channel 18 with steeper inclined walls 33, a reflector arrangement as shown in FIG. 1 can be implemented.

The illustrations in FIG. 3 show two examples of a measuring channel, one of which is an example of the dimension DN50 and the other of DN100. In the example shown, two sensors 6, 6' and 8, 8', respectively, are arranged in pairs in each coupling member 2, 4, so that a parallel coupling and uncoupling of measuring signals takes place.

A difference between the two examples according to FIG. 3 is that with the nominal width DN50, the coupling members 2, 4 enclose a comparatively large part of the outer wall of the measuring channel due to the relatively small measuring channel cross-section, whereby the distance between the sensors 6, 6' or respectively 8, 8' is smaller for the smaller nominal width than for the large nominal width DN100, so that the measuring signals are coupled in and out at a greater distance from each other.

In the flow meter with the larger nominal width DN100, the coupling members 2, 4 are completely within the area of the transverse wall 14.

The coupling members 2, 4 with the sensors 6, 6', 8, 8' are inserted in the recesses 10 provided for this purpose. The recesses 10 can also be produced from the initial profile in a single hydroforming production step, independent of the material. In an example, however, the recesses 10 are formed only after hydroforming, for example by laser cutting or in some other way. In the illustration in FIG. 1, it can also be seen that the transition sections 32 from the transverse walls 14, 24 to the side walls 16, inside the measuring channel 18, are also formed with a rounded shape.

Disclosed is a flow meter with at least two measuring sensors, preferably ultrasonic sensors, arranged at a distance from each other, whereby the coupling of the measuring signals into and out of a fluid takes place via a coupling member, which is inserted into a circumferential wall of a measuring channel produced by hydroforming. Alternatively, the input and output of the measuring signals can also be realized through a wall of the measuring channel.

LIST OF REFERENCE SIGNS 1 flow meter
2 coupling member
4 coupling member
6, 6' sensor
8, 8' sensor
10 recess
12 coupling surface
14 transverse wall
16 side wall
18 measuring channel
20 pipe section
22 flange
24 transverse wall
26 pocket
28 reflector
30 transition section
31 bulging
32 transition section
33 inclined wall
34 inlet
35 signal path
36 outlet

The invention claimed is:

1. A flow meter, comprising a measuring channel, wherein a cross-section profile of the measuring channel is formed by hydroforming, and further wherein the measuring channel includes recesses formed as holes introduced in the process of hydroforming for sensors accommodated in coupling members.

2. The flow meter according to claim 1, wherein the measuring channel includes a non-round cross-section in a region of the recesses.

3. The flow meter according to claim 2, wherein the cross-section profile has a greater height (h) than width (b) approximately in an in-coupling/out-coupling direction of measuring signals.

4. The flow meter according to claim 3, wherein, in a position of use, the cross-section profile is arranged horizontally so that the smaller width (b) is arranged approximately in the direction of gravity.

5. The flow meter according to claim 1, wherein transition sections of the measuring channel are rounded in an area of a deformation.

6. The flow meter according to claim 1, wherein the measuring channel is formed in one piece and with or without flange.

7. The flow meter according to claim 1, wherein during hydroforming a bulge is produced in an area of the recesses.

8. The flow meter according to claim 7, wherein the sensors are arranged in the area of the bulge.

9. The flow meter according to claim 1, wherein the cross-section profile in an area of an inlet and an outlet is a basic profile.

10. The flow meter according to claim 9, wherein the basic profile is a round profile.

11. The flow meter according to claim 1, wherein the sensors sound through a wall of the measuring channel.

12. The flow meter according to claim 1, wherein the holes in the measuring channel are formed to receive the coupling members such that coupling surfaces of the coupling members are flush with a wall of the measuring channel.

13. The flow meter according to claim 1, wherein the recesses are respectively accommodated in each of two inclined walls of a roof-shaped bulging of the measuring channel.

14. The flow meter according to claim 1, wherein the holes are elongated.

15. A measuring channel, comprising recesses for sensors accommodated in coupling members, wherein the measuring channel, including a cross section profile of the measuring channel and the recesses formed as holes for the sensors accommodated in the coupling members, is produced by hydroforming.

16. The measuring channel according to claim 15, configured for use in a flow meter.

17. The measuring channel of claim 15, wherein the holes are formed in the measuring channel to receive the coupling members such that coupling surfaces of the coupling members are flush with a wall of the measuring channel.

18. The measuring channel of claim 15, wherein the recesses are respectively accommodated in each of two inclined walls of a roof-shaped bulging of the measuring channel.

19. The measuring channel according to claim 15, wherein the holes are elongated.

20. A flow meter comprising:
  a measuring channel including a cross-section profile formed by hydroforming;
  a coupling member; and
  a sensor; wherein:
    the sensor is accommodated in the coupling member; and
    the measuring channel includes a recess formed as an elongated hole introduced in the process of hydroforming for receiving the coupling member, such that when the coupling member is inserted in the recess, a coupling surface of the coupling member is flush with a wall of the measuring channel.

* * * * *